Sept. 6, 1955     H. B. NARAMORE     2,716,788
BEADING OR WEATHER STRIP AND METHOD OF MAKING SAME
Filed April 5, 1952
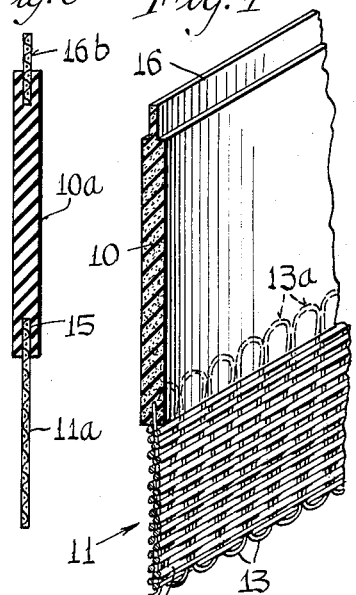
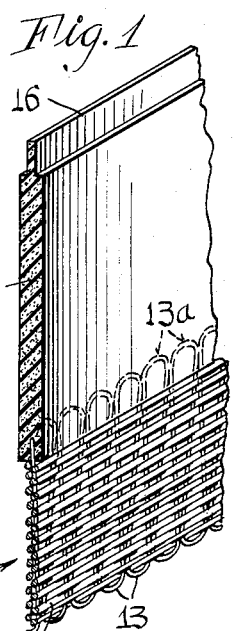
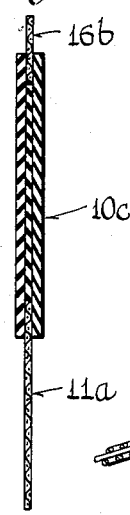
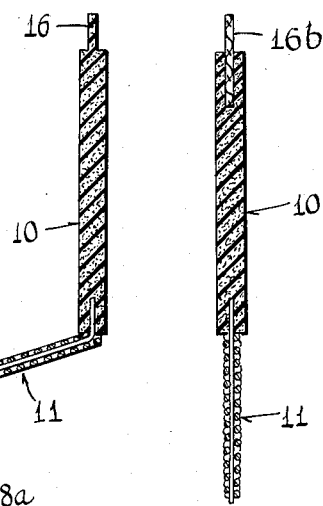
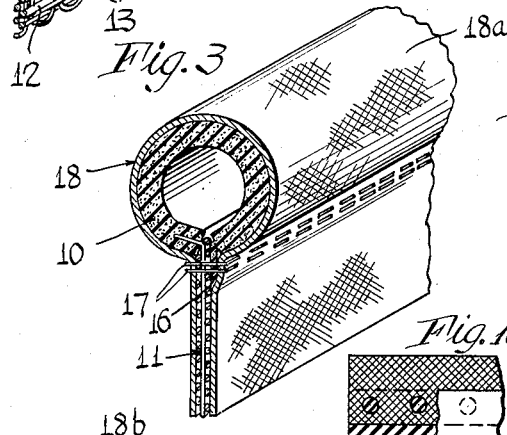
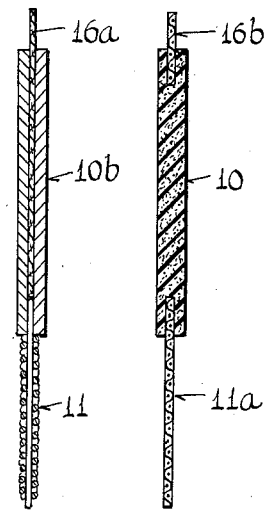
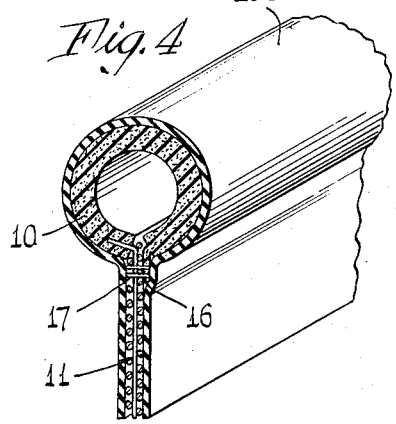
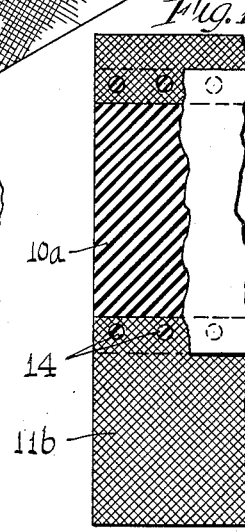
INVENTOR
Harold Burling Naramore
BY Johnson and Kline
ATTORNEYS

United States Patent Office 2,716,788
Patented Sept. 6, 1955

2,716,788

BEADING OR WEATHER STRIP AND METHOD OF MAKING SAME

Harold Burling Naramore, Fairfield, Conn., assignor to Bridgeport Fabrics, Inc., Bridgeport, Conn., a corporation of Connecticut Application April 5, 1952, Serial No. 280,771

13 Claims. (Cl. 20—69)

The present invention relates to beading or weather strips and to the method of making the same.

It is an object of the present invention to produce a weather strip which is economical and simple to manufacture and which is capable of many variations to suit various conditions in use.

In carrying out the invention, an elongate member is provided with a mounting flange projecting from one edge and a securing portion projecting from the other edge. The elongate member is then folded about its longitudinal axis so as to provide a tubular bead portion and the securing portion is fastened to the mounting flange to hold the edges in juxtaposition and the member in tubular form.

In the more specific aspects of the invention, a cover can be provided around the bead portion and the fastening means for the cover utilized to simultaneously fasten the securing portion and attaching flange together with the edges of the elongate member in juxtaposition and the tubular element completely enclosed in the cover. Because of the construction of the elongate member, it can be made of various materials and in various ways by molding, extruding or laminating the material of the elongate member and the mounting flange and the securing portion can be formed integrally with the member or formed as separate elements and secured thereto. These elements can be of various types of materials as may be necessary for the particular job and the cover can be of textile fabric, rubber or other plastic material and secured in place to surround the bead and/or the mounting flange.

In making the weather strip or beading strip a novel method is employed wherein the elongate member and mounting flange and the securing portion are assembled or formed in a flat relationship, thus permitting rapid production thereof in a continuous manner. After the elements have been assembled, they are folded about a longitudinal axis with the edges of the elongate member in juxtaposition so as to provide a tubular bead. With the edges in this position the securing portion and mounting flange are secured together to maintain the member in its tubular form.

If a cover is to be provided, this may be placed to overlie the outer surface of the tubular member and over the mounting flange at the time that the elongate member is folded into tubular form. The means for securing the securing portion to the mounting flange, such as stitching, may be also caused to pass through the cover and hold it in place, thus providing for a structure which can be readily assembled, manufactured and formed in high speed production.

Other features and advantages of the invention will be apparent from the specification and claims when considered in connection with the drawings wherein:

Figure 1 shows a perspective view of the assembled elongate member before it is folded into its final position.

Fig. 2 shows an end view of the member with the mounting flange given a pre-bending operation.

Fig. 3 shows the strip with a textile cover in place thereon.

Fig. 4 is a view similar to Fig. 3 with a rubber cover in place thereon.

Figs. 5 to 10 show various modifications of the assembled elongate member.

As shown in the drawings, the assembled elongate member is first in flat form, as shown in Fig. 1, and comprises an elongate member 10 which may be of any material capable of being folded longitudinally into a self-sustaining tubular member and having sufficient resistance to deformation as to be able to form an effective seal when used as a weather strip. It may be molded of sponge rubber as shown in Figs. 1 to 5, an extruded rubber of plastic section 10a as shown in Fig. 8 or laminated sections 10b, 10c as shown in Figs. 6 and 9. The laminated member may be made of felt or stiff fabrics or combinations thereof as shown in Fig. 6 or of sheet rubber or the like as shown in Fig. 9 securely adhered together.

At one edge there is secured to project therefrom a mounting flange 11. The mounting flange may be formed of a woven fiber and wire strip, as shown in Fig. 1, in which the fiber strands 12 extend parallel to the edge and the wire 13 is looped transversely of the strip with loops 13a projecting from the edge and embedded in the edge of the elongate member or the mounting strip may be a foraminous strip 11a formed of expanded metal, interwoven or braided wires or plastic screening as shown in Figs. 7 to 9, or formed of a stiff fabric material 11b such as crinoline having apertures 14 by which it may be suitably anchored in the elongate member as shown in Fig. 10. The mounting strip may be embedded in the edge when the member 10 is molded or inserted in the slit 15 in the extruded section or between the laminae in the laminated section and secured therein as a part of the central lamination by suitable adhesives.

From the opposite edge of the elongate member a securing portion 16 projects which may be formed integrally, as shown in Fig. 1, or may be formed as an extension of the central lamination, as shown at 16a in Fig. 6, or may be a separate strip 16b having its edge embedded in the edge of the elongate member and secured thereto as shown in Figs. 5 and 7 to 10. The separate strip may be of foraminous material as shown in Figs. 7 to 9 or a fabric strip as shown in Figs. 5 and 10.

After the flat elongate member has been formed with the mounting flange and securing portion, it is folded about its longitudinal axis so as to bring the edges into juxtaposition as shown in Fig. 3.

If the material of the mounting flange and/or securing portion is a stiff material having wire or the like therein, it is preferred to give it a bend to form an obtuse angle with the member as shown in flange 11 in Fig. 2 so that its adjacent edge will have a proper angular relation with its mounting flange so as to produce a substantially tubular section.

When the member 10 is folded to juxtapose the edges, the securing portion overlies the mounting flange as shown in Figs. 3 and 4 so that they may be secured together by any suitable means such as stitching 17, cement or combinations thereof and hold the member in tubular form.

If desired, a cover 18 which may be of textile material 18a, as shown in Fig. 3, or a coating or sheeting of plastic material, such as polyvinyl or polyethylene or the like or rubber 18b as shown in Fig. 4, may be applied around the tubular member and also along the mounting member if desired.

To facilitate the manufacture, the cover may be applied and folded around the strip at the time the elongate member is folded into tubular shape and the stitching 17 will simultaneously secure the cover in position and also the securing portion to the mounting flange as shown in Fig. 3.

When the securing portion is secured to the mounting flange by stitching prior to the application of the cover thereover as shown in Fig. 4, the cover is preferably cemented to the outer surface of the bead and/or mounting flange.

By combining the various types of elongate members with the various types of mounting flanges and securing portions and by securing the flange and securing portion together in the desired manner and applying the required cover thereon, it will be seen that a strip to fulfill many different requirements as to cost and use may be obtained.

While the strip herein, because of the nature of the bead, is particularly useful for use as a weather strip, it is to be understood that it can be also used as an ornamental beading strip when desired.

From the foregoing it will be seen that a novel method is provided wherein the strip is formed in a flat relation and then folded into the desired shape and a cover applied if required and all secured in a single operation which greatly reduces the cost of the strip.

Variations and modifications may be made within the scope of the claims and portions of the improvements may be used without others.

I claim:

1. A beading or weather strip comprising an elongate member having a mounting flange projecting from one edge and a narrow securing portion projecting from the other edge, said elongate member being bent about a longitudinal axis with the edges in juxtaposition to form a tubular bead with the flange and securing portion disposed outwardly of the bead; and means securing the mounting flange and securing portion together along the juxtaposed edges adjacent the bead to retain the elongate member in tubular form with the mounting flange projecting therefrom.

2. The invention as defined in claim 1 wherein the mounting flange comprises a woven fibrous and metal strip having loops along one edge embedded in the edge of the elongate member and the remainder of the strip extending at an obtuse angle to said edge.

3. The invention as defined in claim 1 wherein the mounting flange comprises a foraminous strip having an edge embedded in the edge of the elongate member.

4. The invention as defined in claim 1 wherein the mounting flange comprises a textile strip having anchoring means along the edges thereof secured to the elongate member.

5. The invention as defined in claim 1 wherein the elongate member comprises a molded sponge rubber body with the securing portion formed integral therewith.

6. The invention as defined in claim 1 wherein the elongate member comprises an extruded body having slits at the edges to receive the edge of the mounting strip and the securing portion.

7. The invention as defined in claim 1 wherein the elongate member comprises a laminated body with the center lamination extending beyond the edges of the outer lamination to form the securing portion.

8. A beading or weather strip comprising an elongate member having a mounting flange projecting from one edge and a narrow securing portion projecting from the other edge, said elongate member being bent about a longitudinal axis with the edges in juxtaposition to form a tubular bead with the mounting flange projecting outwardly therefrom; securing means securing the mounting flange and securing portion together along the juxtaposed edges adjacent the bead to retain the elongate member in tubular form; and a cover enclosing the bead and mounting flange.

9. The invention as defined in claim 8 wherein securing means for the mounting strip and securing portion connects and holds the cover around the bead.

10. The invention as defined in claim 8 wherein the cover comprises a textile material and the securing means comprises stitching passing through the cover, mounting strip and securing portion.

11. The invention as defined in claim 8 wherein the cover comprises a rubber sheath cemented in place to overlie at least the bead and secured together portion of the mounting strip and securing portion.

12. The invention as defined in claim 8 wherein the cover comprises a plastic coating adhered to the bead and mounting strip.

13. The method of making a beading or weather strip comprising the steps of forming an elongate flat member having a mounting flange projecting from one edge and a securing portion projecting from the other edge; laying the elongate member on a cover strip; folding the elongate member and cover strip longitudinally to form a tubular bead with the edges in juxtaposition and the adjacent mounting flange and securing portion in overlapped relation and projecting from the bead and the cover strip enclosing the same; and stitching the cover and overlapped portions together adjacent the bead to secure the cover in place and hold the elongate member in tubular form.

References Cited in the file of this patent

UNITED STATES PATENTS

| 1,897,928 | Fox | Feb. 14, 1933 |
| 1,958,131 | Davidson | May 8, 1934 |
| 2,139,780 | Tea | Dec. 13, 1938 |
| 2,347,158 | Spraragen | Apr. 18, 1944 |